(12) United States Patent
Jenkins et al.

(10) Patent No.: US 9,676,257 B2
(45) Date of Patent: Jun. 13, 2017

(54) INTEGRATED LATERAL LOAD-TRANSMITTAL SYSTEM

(71) Applicant: Ford Global Technologies, LLC, Dearborn, MI (US)

(72) Inventors: Keith William Jenkins, Plymouth, MI (US); Deepak Patel, Canton, MI (US); Satyanarayana Raju Vemulapati, Westland, MI (US); Djamal Eddine Midoun, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/947,115

(22) Filed: Nov. 20, 2015

(65) Prior Publication Data

US 2016/0075219 A1 Mar. 17, 2016

Related U.S. Application Data

(62) Division of application No. 14/269,412, filed on May 5, 2014, now Pat. No. 9,238,484.

(51) Int. Cl.
*B60J 7/00* (2006.01)
*B60J 5/04* (2006.01)
*B62D 21/15* (2006.01)

(52) U.S. Cl.
CPC ........... *B60J 5/0461* (2013.01); *B60J 5/0451* (2013.01); *B62D 21/157* (2013.01)

(58) Field of Classification Search
CPC ... B60J 5/0451; B60J 5/0461; B60R 21/0428; B60R 22/42; B62D 21/157; E05Y 2900/531; B60G 11/27; A61M 2210/0687

USPC ..... 296/187.12, 146.6, 146.7, 146.1, 203.03; 180/274; 414/492

See application file for complete search history.

(56) References Cited

U.S. PATENT DOCUMENTS

| 4,231,607 | A | | 11/1980 | Bohlin | |
|---|---|---|---|---|---|
| 4,438,969 | A | * | 3/1984 | Kamijo | B60J 5/0458 296/146.9 |
| 5,000,509 | A | * | 3/1991 | Sinnhuber | B60J 5/0451 296/187.12 |
| 5,110,176 | A | * | 5/1992 | Curtis | B62D 21/157 296/187.12 |
| 5,328,234 | A | * | 7/1994 | Daniel | B60N 2/4235 296/68.1 |

(Continued)

*Primary Examiner* — Kiran B Patel
(74) *Attorney, Agent, or Firm* — Vichit Chea; Price Heneveld LLP (57) ABSTRACT

According to one aspect of the present invention, a load-transmittal system for a vehicle includes a cross member of a vehicle frame extending substantially perpendicular to a vehicle door. A pusher is disposed within a cavity defined between inner and outer sheet metal panels of the vehicle door, wherein the pusher is disposed distal from the cross member to define an idle state. A container receptacle is disposed between the pusher and the cross member, wherein the container receptacle defines a transmittal zone of the vehicle door. When the vehicle door experiences a side-impact load, the side-impact load moves the pusher through the transmittal zone and into at least partial engagement with the cross member to define a collapsed position of the pusher. In this manner, the side-impact load is transferred through the pusher to the cross member.

10 Claims, 8 Drawing Sheets

(56) References Cited

U.S. PATENT DOCUMENTS

| | | | | |
|---|---|---|---|---|
| 5,464,266 A * | 11/1995 | Guertler | B60R 19/42 | |
| | | | 293/109 | |
| 5,482,344 A * | 1/1996 | Walker | B60R 21/0428 | |
| | | | 280/751 | |
| 5,573,298 A * | 11/1996 | Walker | B60J 5/0451 | |
| | | | 296/146.6 | |
| 5,671,968 A | 9/1997 | Masuda et al. | | |
| 5,749,600 A * | 5/1998 | Yamada | B60J 5/0425 | |
| | | | 280/751 | |
| 5,857,702 A * | 1/1999 | Suga | B60J 5/0451 | |
| | | | 188/377 | |
| 5,865,496 A * | 2/1999 | Odan | B60J 5/0425 | |
| | | | 280/751 | |
| 5,984,402 A * | 11/1999 | Takeuchi | B62D 21/157 | |
| | | | 296/187.12 | |
| 6,237,991 B1 | 5/2001 | Weber | | |
| 6,299,238 B1 * | 10/2001 | Takagi | B60N 2/4235 | |
| | | | 296/187.12 | |
| 6,299,239 B1 * | 10/2001 | Sagawa | B60N 2/4235 | |
| | | | 296/187.12 | |
| 6,592,166 B2 * | 7/2003 | Motozawa | B60N 2/06 | |
| | | | 296/65.12 | |
| 6,786,534 B1 * | 9/2004 | Peng | B60J 5/042 | |
| | | | 296/187.08 | |
| 6,851,740 B1 * | 2/2005 | Peng | B62D 21/157 | |
| | | | 296/187.02 | |
| 6,955,391 B1 * | 10/2005 | Peng | B60R 21/0428 | |
| | | | 280/751 | |
| 7,216,924 B2 * | 5/2007 | Li | B62D 25/025 | |
| | | | 296/187.12 | |
| 7,328,938 B2 | 2/2008 | Matsuda | | |
| 7,387,327 B2 * | 6/2008 | Tencer | B60N 2/062 | |
| | | | 280/751 | |
| 7,441,826 B2 * | 10/2008 | Frank | B60J 5/0447 | |
| | | | 296/146.6 | |
| 7,556,301 B2 * | 7/2009 | Govind | B60N 2/4235 | |
| | | | 296/1.09 | |
| 8,132,852 B2 * | 3/2012 | Yamaki | B60N 2/4235 | |
| | | | 296/187.08 | |
| 8,162,385 B2 * | 4/2012 | Yamaki | B60N 2/4235 | |
| | | | 296/187.12 | |
| 8,827,350 B1 * | 9/2014 | Deng | B60J 5/0461 | |
| | | | 296/146.6 | |
| 2006/0033357 A1 * | 2/2006 | Karuppaswamy | B60J 5/0451 | |
| | | | 296/146.6 | |
| 2006/0202513 A1 * | 9/2006 | Matsuda | B60N 2/4235 | |
| | | | 296/187.12 | |
| 2006/0261635 A1 * | 11/2006 | Winborn | B60J 5/0418 | |
| | | | 296/154 | |
| 2009/0284041 A1 * | 11/2009 | Hall | B60J 5/0451 | |
| | | | 296/146.6 | |
| 2010/0201112 A1 * | 8/2010 | Subbian | B60J 5/0425 | |
| | | | 280/784 | |
| 2011/0169302 A1 * | 7/2011 | Deng | B60J 5/042 | |
| | | | 296/187.12 | |
| 2012/0217774 A1 * | 8/2012 | Ohrai | B60N 2/4235 | |
| | | | 297/216.1 | |

* cited by examiner

FIG. 10 though, as indicated herein, may be in a variety of different orientations, depending on the orientation of the vehicle door 12. The container receptacle 30 defines the transmittal zone 32 that is configured to receive the pusher 20 upon receipt of the side-impact load 34. The pusher 20, disposed within the container receptacle 30, is configured to move within the container receptacle 30 through the transmittal zone 32 to engage the structural member 18 of the vehicle frame 14.

INTEGRATED LATERAL LOAD-TRANSMITTAL SYSTEM

CROSS-REFERENCE TO RELATED APPLICATION

The present application is a divisional of U.S. patent application Ser. No. 14/269,412 filed May 5, 2014, entitled INTEGRAL LATERAL LOAD-TRANSMITTAL SYSTEM, the entire disclosure of which is hereby incorporated herein by reference.

FIELD OF THE INVENTION

The present invention generally relates to a load-transmittal system for a vehicle, and more specifically, an integrated load-transmittal system for a vehicle that incorporates a pusher that is at least partially integrated with a container receptacle for a vehicle door.

BACKGROUND OF THE INVENTION

Typically, vehicles are designed such that forces from lateral impacts due to collisions with other vehicles or various objects outside the vehicle are at least partially directed away from the passenger cabin of the vehicle. Many vehicles are designed such that the load exerted upon the vehicle as a result of these impacts are transferred to areas of the vehicle that are not occupied by the driver or passengers of the vehicle in order to minimize the effect of the impact upon the various occupants of the vehicle.

SUMMARY OF THE INVENTION

According to one aspect of the present invention, a load-transmittal system for a vehicle includes a member of a vehicle frame extending substantially perpendicular to a vehicle door. A pusher is disposed within a cavity defined between inner and outer sheet metal panels of the vehicle door, wherein the pusher is disposed distal from the cross member to define an idle state. A container receptacle is disposed between the pusher and the cross member, wherein the container receptacle defines a transmittal zone of the vehicle door. When the vehicle door experiences a side-impact load, the side-impact load moves the pusher through the transmittal zone and into at least partial engagement with the cross member to define a collapsed position of the pusher. In this manner, the side-impact load is transferred through the pusher to the cross member.

According to another aspect of the present invention, a load-transfer system includes a pusher disposed within a vehicle door in an idle position distal from the vehicle frame structural member. A transmittal zone of the vehicle door is positioned proximate the pusher and the structural member. When the vehicle door receives a side-impact load, the pusher moves through the transmittal zone to a collapsed position into engagement with the structural member and transfers the side-impact load to the structural member.

In yet another aspect of the present invention, a side-impact transfer system includes a pusher in an idle position within a vehicle door that is aligned with and distal from a vehicle frame structural member. A transmittal zone of the vehicle door is configured to receive the pusher when the vehicle door receives a side-impact load. The transmittal zone of the vehicle door also guides the pusher into a collapsed position in engagement with the structural member, such that the pusher transfers the side-impact load to the structural member.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
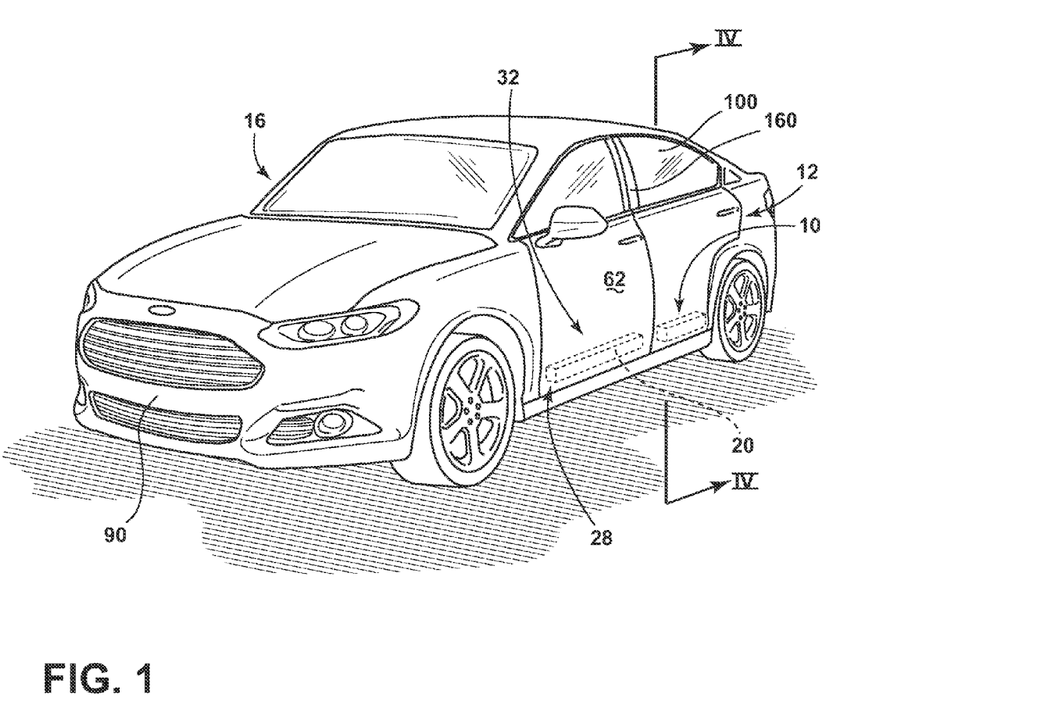
FIG. 1 is a side perspective view of a vehicle incorporating an embodiment of the load-transfer system.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As shown in FIGS. 1-5, reference numeral 10 generally refers to a load-transfer system incorporated within the vehicle door 12 and vehicle frame 14 of a vehicle 16, according to one embodiment. The load-transfer system 10 includes a structural member 18 of the vehicle frame 14 that extends substantially perpendicular toward the vehicle door 12. A pusher 20 is disposed within a cavity 22 defined between inner and outer sheet metal panels 24, 26 of the vehicle door 12, wherein the pusher 20 is disposed distal from the structural member 18 in an idle state 28. A container receptacle 30 is disposed between the pusher 20 and the structural member 18, wherein the container receptacle 30 defines a transmittal zone 32 of the vehicle door 12. When the vehicle door 12 experiences a side-impact load 34, the side-impact load 34 moves the pusher 20 through the transmittal zone 32 and into at least partial engagement with the structural member 18 to define a collapsed position 36. In this manner, the side-impact load 34 is transferred through the pusher 20 to the structural member 18. It is contemplated that the pusher 20 can be integrated with the container receptacle 30, such that the pusher 20 forms at least a portion of the structure of the container receptacle 30.

Figure 2:
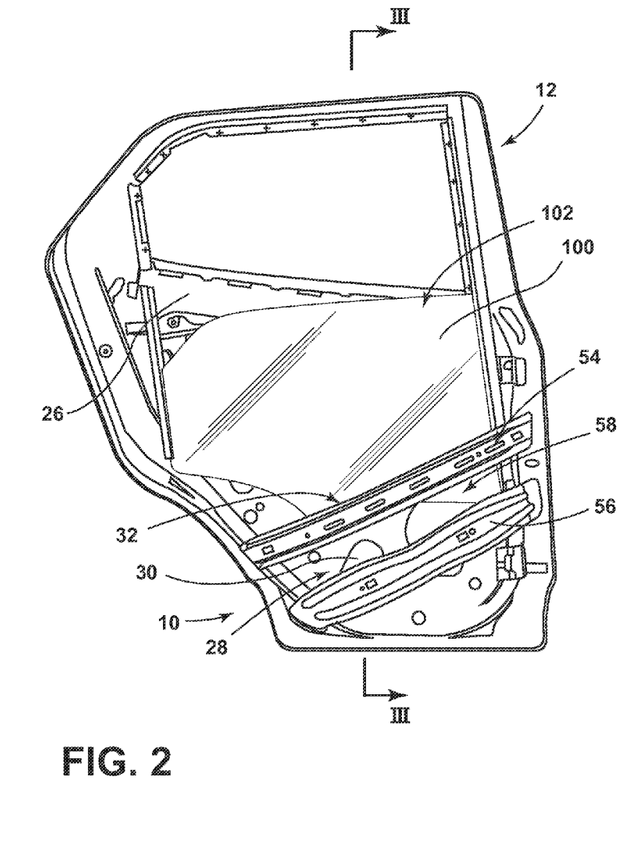
FIG. 2 is an elevation view of the interior side of the vehicle door of FIG. 1, with the inner door trim removed.
Figure 3:
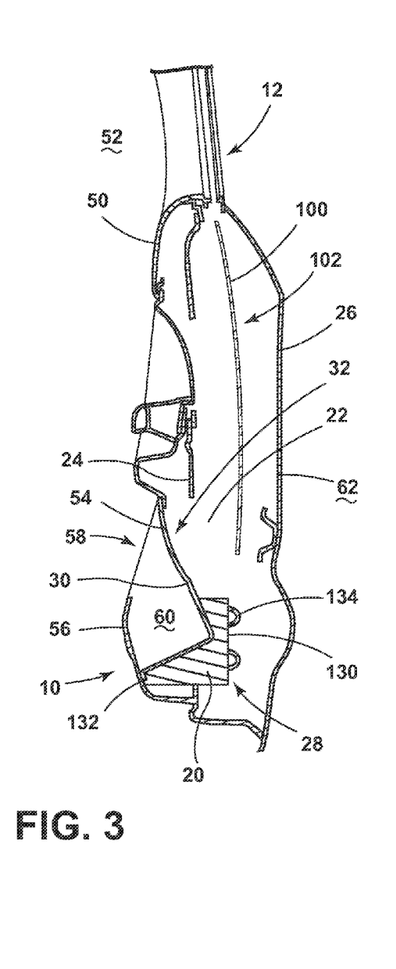
FIG. 3 is a cross-sectional view of the vehicle door of FIG. 2, taken along line III-III.

Referring to FIGS. 2 and 3, the vehicle door 12 can include a plurality of structural components, including the inner and outer sheet metal panels 24, 26, as well as an inner door trim 50 disposed on the vehicle door 12 proximate the cabin. According to one embodiment of the load-transfer system 10, the inner sheet metal panel 24 can be separated into a plurality of members, wherein the location of these members can at least partially define the transmittal zone 32 at the vehicle door 12. In this manner, the vehicle door 12 can include upper and lower strips 54, 56 that at least partially define the transmittal zone 32 of the vehicle door 12 and also provide a structure to which the container receptacle 30 and, in various embodiments, the pusher 20, can attach. It is contemplated that the upper and lower strips 54, 56 can be made of various materials that can include, but are not limited to, metal, plastic, composite, combinations thereof, as well as other similar materials. Additionally, the space between the upper and lower strips 54, 56 can define a gap 58 through which an occupant of the vehicle 16 can reach in order to access an interior volume 60 defined by the container receptacle 30. Additionally, the gap 58 defined between the upper and lower strips 54, 56 can serve to position at least a portion of the pusher 20 and the container receptacle 30, such that when the side-impact load 34 is exerted upon the vehicle door 12, the area proximate the upper and lower strips 54, 56 can assist in moving the pusher 20 through the transmittal zone 32. In this manner, the pusher 20 can move toward the structural member 18 and transfer the lateral force of the side-impact load 34 from the exterior 62 of the vehicle door 12 to the pusher 20 and from the pusher 20 into the structural member 18 of the vehicle frame 14. Accordingly, substantial portions of the side-impact load 34 can be directed to various portions of the vehicle frame 14, such as the kick-up cross member 64 or other structural members 18 of the vehicle frame 14. Accordingly, the amount of force from the side-impact load 34 directed toward the passenger cabin 52 can be lessened as a result of the transfer of force from the pusher 20 to the structural member 18 of the vehicle frame 14.

Referring again to FIGS. 2-5, it is contemplated that the pusher 20 can be integrated with a portion of the container receptacle 30, such that the pusher 20 forms at least part of the structure for the container receptacle 30. In the various embodiments, the container receptacle 30 can include a bottle holder, cup holder, map pocket, or other storage space within the vehicle door 12. It is further contemplated that the transmittal zone 32 of the vehicle door 12 defined by the upper and lower strips 54, 56 can be free of a container receptacle 30, such that the pusher 20 is disposed proximate the transmittal portion and the upper and lower strips 54, 56, such that the transmittal zone 32 of the vehicle door 12 is adapted to receive the pusher 20 when the vehicle door 12 receives the side-impact load 34. In this manner, the transmittal zone 32, including the upper and lower metal strips 54, 56, is configured to guide the pusher 20 toward and into the collapsed position 36 in at least partial engagement with the structural member 18, such that the pusher 20 can transfer the side-impact load 34 to the structural member 18.

Referring again to FIGS. 2-5, it is contemplated that the position of the pusher 20 within the transmittal zone 32 serves to at least partially occupy the cavity 22 between the outer sheet metal panel 26 and the inner sheet metal panel 24. In this manner, as the side-impact load 34 engages the exterior 62 of the vehicle door 12 and the outer sheet metal panel 26, the pusher 20 substantially limits the distance that the outer sheet metal panel 26 can deflect, within the transmittal zone 32, relative to the inner sheet metal panel 24 and the inner door trim 50. Accordingly, the pusher 20 is configured to substantially decrease the distance that the outer sheet metal panel 26 and other portions of the vehicle door 12 proximate the transmittal zone 32 will travel before the side-impact load 34 is transferred to the structural member 18 of the vehicle frame 14. The pusher 20 serves to receive the side-impact load 34 from the outer sheet metal panel 26 after the outer sheet metal panel 26 has moved a relatively minimal distance toward the passenger cabin 52. In turn, the pusher 20 can be adapted to move a relatively minimal distance from the idle state 28 and into the collapsed position 36 to transfer the side-impact load 34 into the structural member 18. Accordingly, due to the positioning of the pusher 20, the portions of the vehicle door 12 proximate the transmittal zone 32 can deflect a relatively minimal distance in order to transfer the side-impact load 34 to the structural member 18. As such, a substantial portion of the side-impact load 34 can be transferred to the structural member 18 and the portion of the side-impact load 34 transferred into the passenger cabin 52 can be substantially lessened.

Figure 4:
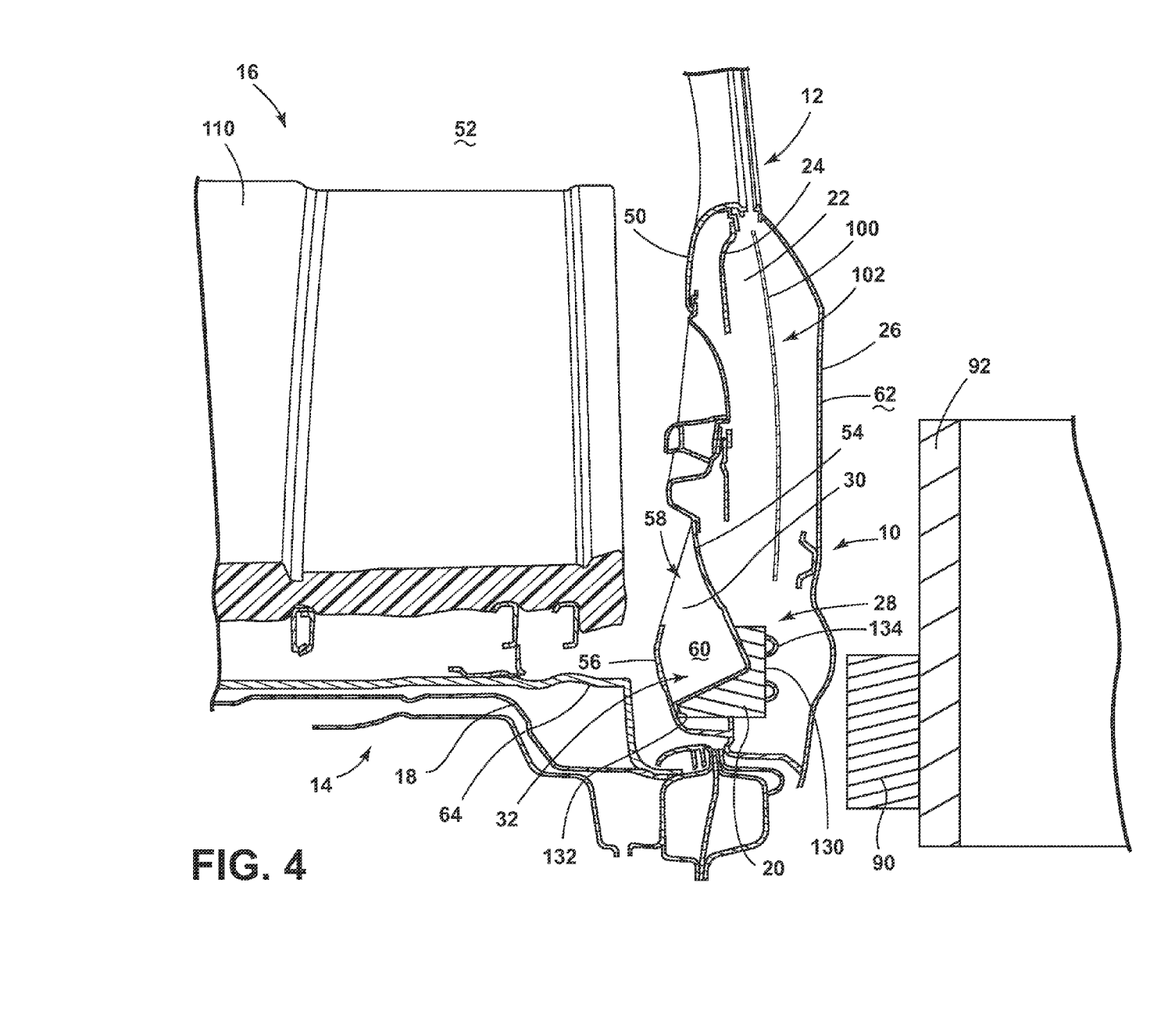
FIG. 4 is a cross-sectional view of the load-transfer system of the vehicle of FIG. 1, taken along line IV-IV, with the pusher in an idle state.
Figure 5:
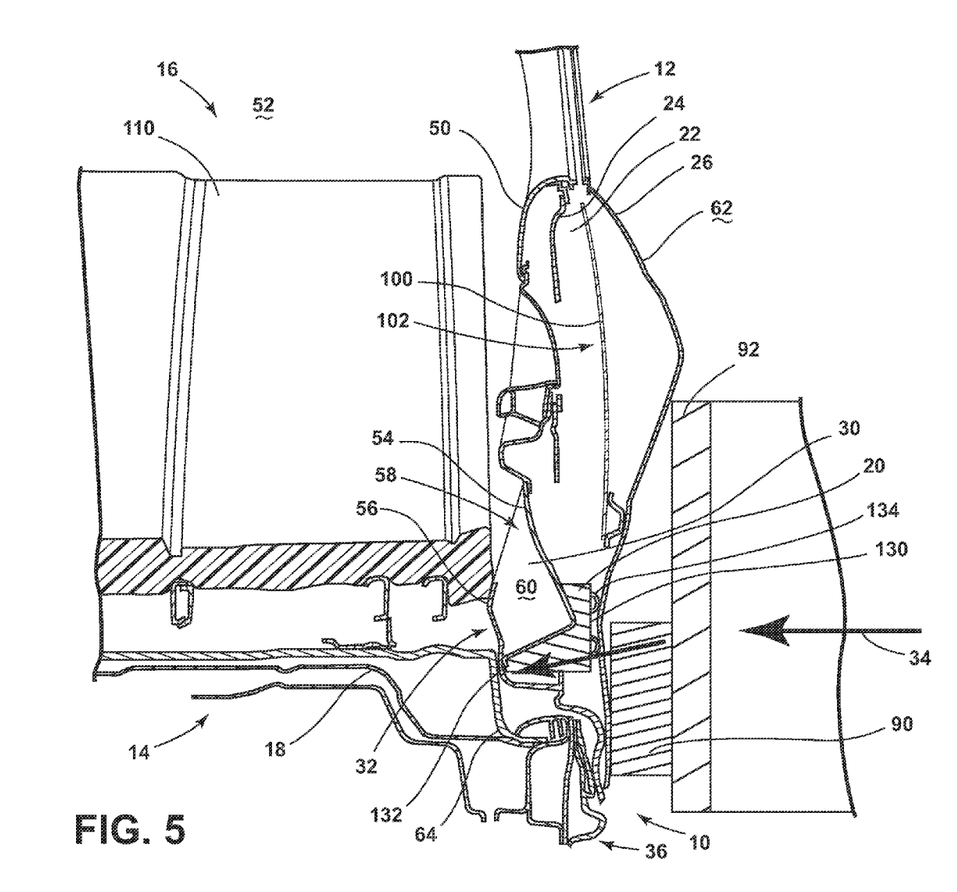
FIG. 5 is a cross-sectional view of the load-transfer system of FIG. 4 with the pusher in a collapsed position.

Referring now to FIGS. 4 and 5, in various embodiments, during various collisions, which can include side-impact collisions, diagonal collisions, and other similar collisions, the transmittal zone 32 of the vehicle door 12 is adapted to deflect due to the side-impact load 34 substantially less than other portions of the vehicle door 12 outside of the transmittal zone 32 due to the positioning of the pulse 20 between the inner and outer sheet metal panels 24, 26. In this manner, the pusher 20 is designed to receive a substantial portion of the side-impact load 34 while in the idle state 28. Due to the ability of the transmittal zone 32 of the vehicle door 12 to deflect substantially less than other portions of the vehicle door 12, the pusher 20 disposed proximate the transmittal zone 32 can be moved toward the collapsed position 36 and into at least partial engagement with one or more of the structural members 18 of the vehicle frame 14 substantially before portions of the vehicle door 12 can substantially move further into the passenger cabin 52 of the vehicle 16. In this manner, the transmittal zone 32 of the vehicle door 12, in conjunction with the pusher 20 and the container receptacle 30 of the vehicle door 12, are configured to direct the side-impact load 34 into the structural member 18 of the vehicle frame 14.

Referring again to FIGS. 4 and 5, due to the positioning of the transmittal zone 32, the pusher 20 is generally disposed at approximately the height of a bumper 90 of a vehicle 16. As such, when the bumper 90 of an oncoming vehicle 92 impacts the vehicle door 12, the side-impact forces can be primarily directed to the pusher 20. Additionally, in circumstances where the bumper 90 is above or below the pusher 20, the configuration of the transmittal zone 32 of the vehicle door 12 can substantially direct the side-impact forces toward and into the pusher 20. Because the transmittal zone 32 is adapted to deform substantially less than other portions of the vehicle door 12, side-impact forces can be at least partially diverted, from a trajectory distal from the pusher 20, toward the pusher 20 as the transmittal zone 32 deflects.

Referring again to FIGS. 2-5, it is contemplated that the operable window panel 100 disposed within the vehicle door 12 can remain substantially free of engagement with exterior portions 62 of the vehicle door 12 during a side-impact collision. In this manner, the operable window panel 100, in the lowered position 102, can remain generally above the transmittal zone 32 of the vehicle door 12, such that, when the transmittal zone 32 guides the side-impact forces through the pusher 20 from the idle state 28 to the collapsed position 36, portions of the vehicle door 12 do not substantially engage the operable window panel 100. That is, the pusher 20 substantially prevents the outer sheet metal panel 26 from substantially deflecting into the cavity 22 such that the operable window panel 100 can be substantially free of engagement with the outer sheet metal panel 26. Accordingly, the breakage of glass during a side impact can be substantially reduced as a result of the side-impact forces 34 being directed through the vehicle door 12 at the transmittal zone 32, which is disposed at least partially below the operable window panel 100.

Referring again to FIGS. 4 and 5, the positioning of the transmittal zone 32 of a vehicle door 12 is also designed such that the side-impact load 34 is transferred to the vehicle frame 14 below the various vehicle seats 110 within the vehicle 16. Accordingly, the pusher 20 is configured to be positioned at least partially below the container receptacle 30, such that, when the side-impact load 34 reaches the pusher 20, the pusher 20 moves toward an inner portion of the car, but is disposed low enough in the vehicle door 12 that the side-impact load 34 is directed toward the vehicle frame 14 rather than the vehicle seats 110. Additionally, the movement of the pusher 20 through the transmittal zone 32 of the vehicle door 12 can also limit the movement of upper portions of the vehicle door 12 inward toward the passenger cabin 52. These upper portions of a vehicle door 12 can include, but are not limited to, vehicle armrests, vehicle handles, various portions of the inner door trim 50, as well as other portions of the vehicle door 12 positioned above the transmittal zone 32.

Figure 6:
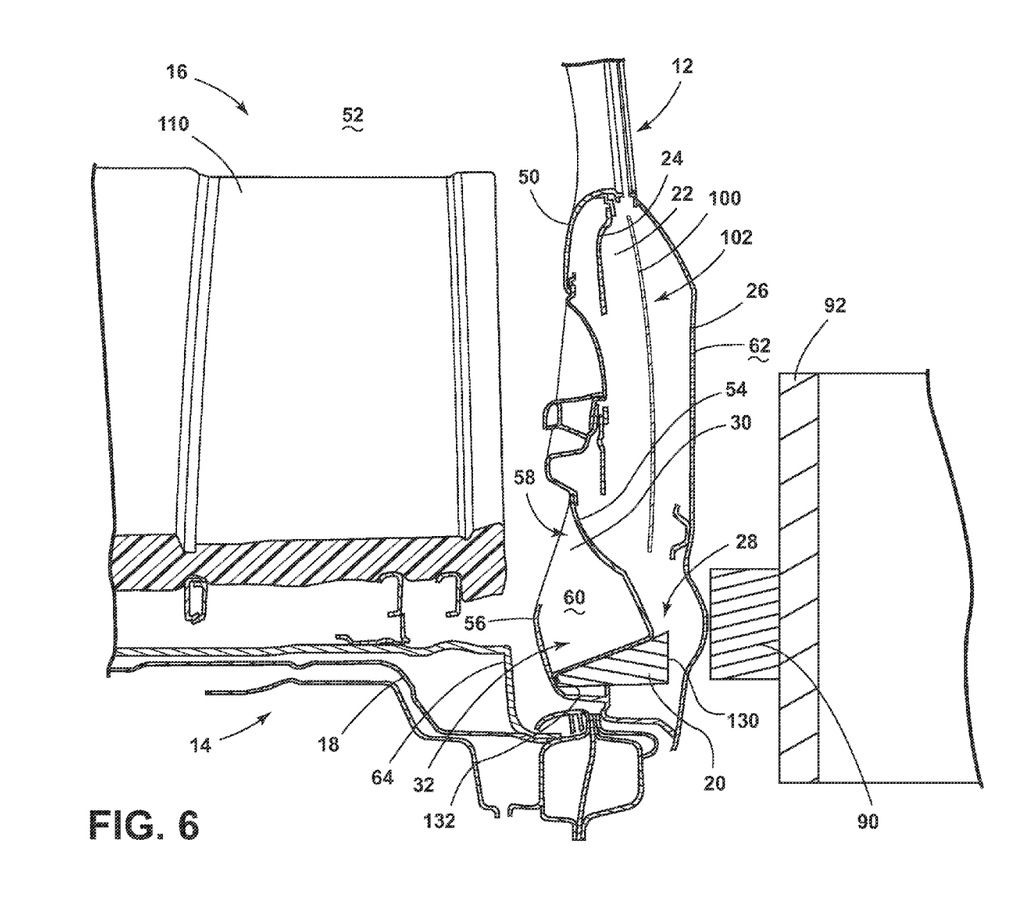
FIG. 6 is an alternate embodiment of the load-transfer system of FIG. 4 with the pusher in an idle state.

Referring now to FIG. 6, it is contemplated that the pusher 20 can be disposed below the container receptacle 30 of the vehicle door 12. In this manner, the portion of the pusher 20 can include the receiving side 130 disposed proximate the outer sheet metal panel 26 that can have a larger surface area than a transferring side 132 of the pusher 20. It is contemplated that the receiving side 130 of the pusher 20 has a larger surface area onto which the side-impact load 34 can be directed during a side-impact condition. The pusher 20 can then be tapered toward the transferring side 132 of the pusher 20, which can be at least partially below the receiving side 130 of the pusher 20. In this manner, the side-impact force can be directed inward and at least partially downward toward the vehicle frame 14 in order to transfer substantial portions of the side-impact load 34 away from the passenger cabin 52 and toward the vehicle frame 14.

Referring again to FIGS. 4-6, in various embodiments, the receiving side 130 of the pusher 20 can be oriented in a substantially vertical position. In such an embodiment, the receiving side 130 can receive the side-impact load 34 such that the side-impact load 34 moves the pusher 20 in a generally horizontal direction. As discussed above, the pusher 20 can be configured to taper toward the transition side of the pusher 20 so that the side-impact force can also be directed generally downward toward the structural member 18 of the vehicle frame 14.

In alternate embodiments, the receiving side 130 of the pusher 20 can be an angled surface that is at least partially angled downward toward the structural member 18 of the vehicle frame 14. In such an embodiment, the angle of the receiving side 130 of the pusher 20 can assist in directing the side-impact load 34 laterally and downward toward the structural member 18 of the vehicle frame 14. It is also contemplated that the receiving side 130 of the pusher 20 can be configured to have other geometries that include, but are not limited to, curved, rectilinear, irregular, circular, combinations thereof and other configurations that can assist the pusher 20 in directing side-impact loads 34 toward the structural member 18.

Referring again to FIGS. 3-5 and 7, in various embodiments, the pusher 20 can include one or more receiving members 134 that are disposed on the receiving side 130 of the pusher 20. The receiving members 134 can be adapted to further direct the pusher 20 toward the collapsed position 36. In such an embodiment, the receiving members 134 are adapted to receive the outer sheet metal panel 26 when a side-impact force is exerted against the vehicle door 12. In this manner, the receiving members 134 are substantially the first portion of the pusher 20 to receive the effects of the side-impact load 34. Additionally, it is contemplated that the receiving members 134 can be made of a substantially flexible material such that the receiving members 134 provide an at least partial cushion between the outer sheet metal panel 26 and the pusher 20 as the side-impact load 34 moves the outer sheet metal panel 26 against the pusher 20. Accordingly, the receiving members 134 substantially prevent damage to the pusher 20 as the pusher 20 moves toward the collapsed position 36. It is further contemplated that the receiving members 134, in various embodiments, can be adapted to position the pusher 20 within the vehicle door 12, wherein the receiving members 134 are attached to at least a portion of the vehicle door 12 and the pusher 20 is attached to the receiving members 134 to position the pusher 20 in the idle state 28.

In the various embodiments where the pusher 20 is disposed below the container receptacle 30, it is contemplated that at least a portion of the pusher 20 can define the bottom surface of the container receptacle 30. Additionally, it is contemplated that in the various embodiments, the pusher 20 is configured to be disposed proximate the lower strip 56 of the transmittal zone 32 of the vehicle door 12. In various alternate embodiments, the pusher 20 can be disposed proximate the upper strip 54 or can be disposed between or behind both the upper and lower strips 54, 56 of the transmittal zone 32.

In the various embodiments, it is contemplated that the pusher 20 can be attached to one or more of the upper and lower strips 54, 56. It is also contemplated that the pusher 20 can be coupled to another portion of the inner sheet metal panel 24 or another portion of the vehicle door 12, such as the outer sheet metal panel 26, the door trim, or other portions of the vehicle door 12.

Figure 7:
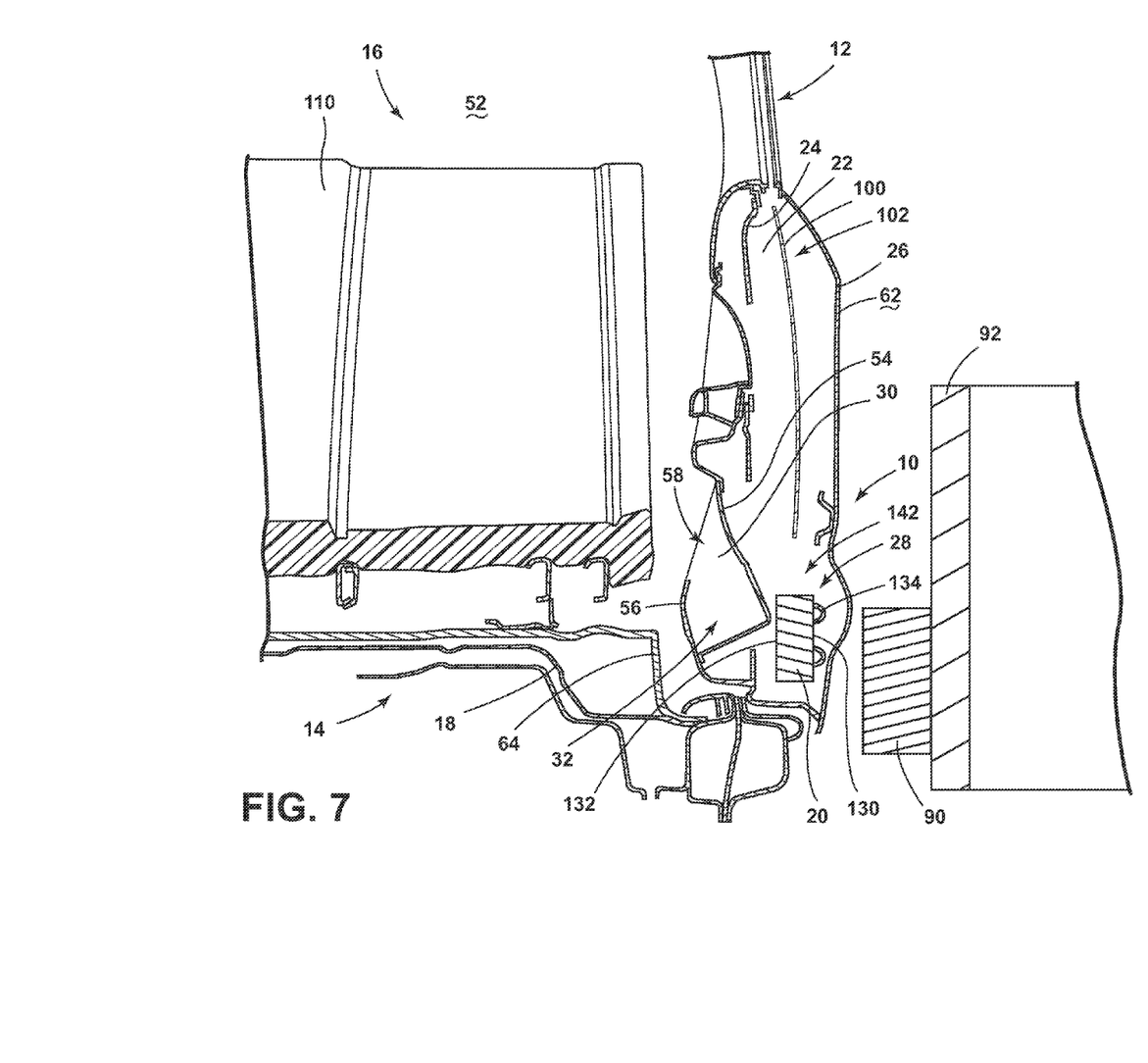
FIG. 7 is an alternate embodiment of the load-transfer system of FIG. 4 with the pusher in an idle state.

Referring now to FIG. 7, in the various embodiments, the pusher 20 can be defined by a separate member that is spaced apart from the container receptacle 30. In such an embodiment, the pusher 20 disposed on a wet side 142 of the vehicle door 12 proximate the outer sheet metal panel 26. In such an embodiment, the pusher 20 can be made of substantially waterproof material, such that when moisture enters the wet side 142 of the vehicle door 12, the moisture will not substantially degrade the pusher 20 during use of the vehicle 16. In such an embodiment, the pusher 20 is configured to operate in conjunction with the container receptacle 30 to direct the side-impact load 34 to the structural member 18. In this manner, it is contemplated that the container receptacle 30 can include various structural reinforcements to assist the pusher 20 in transferring the side-impact load. Such structural reinforcements can be positioned on or within a surface of the container receptacle 30 and can include various ribs 150 (shown in FIGS. 8-10) or other similar reinforcing members.

It is contemplated that in the various embodiments, both where the pusher 20 is integrated with or distal from the container receptacle 30, the pusher 20 can be a substantially solid member. In such an embodiment, the pusher 20 can be made of materials that can include, but are not limited to, metal, plastic, polymers, rubber, resin, and other substantially sturdy materials that can be used to transfer the side-impact force from the exterior 62 of the vehicle door 12 to the vehicle frame 14.

Figure 8:
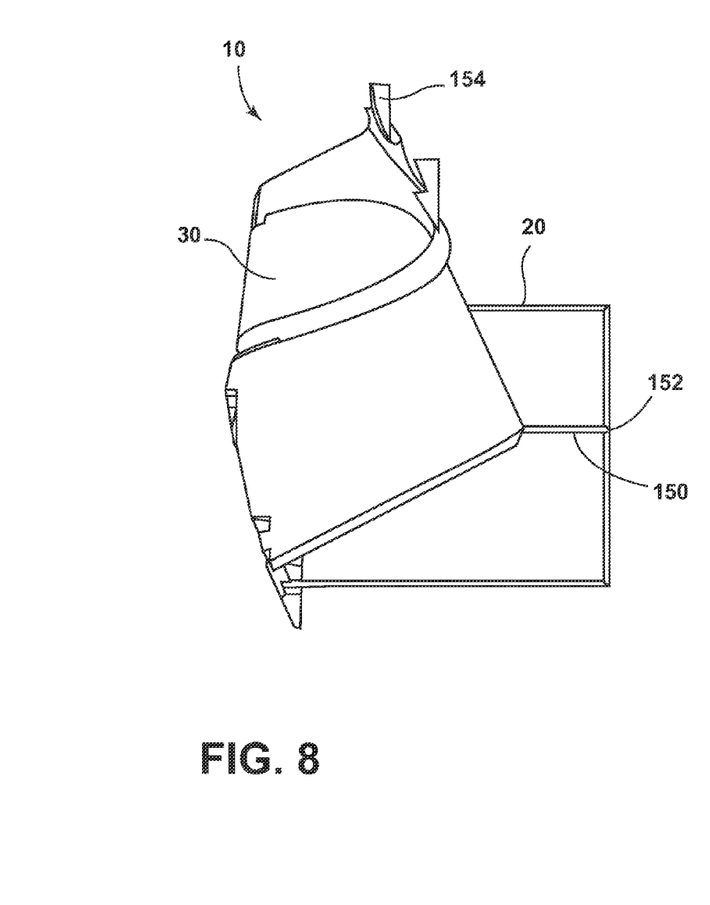
FIG. 8 is a detailed elevational view of an embodiment of an integrated pusher and container receptacle for the load-transfer system.
Figure 9:
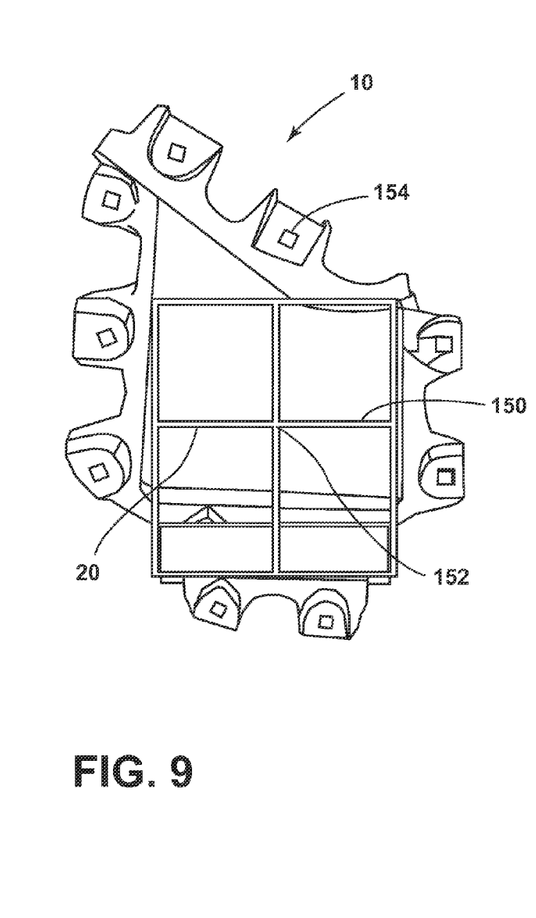
FIG. 9 is a second elevational view of the integrated pusher and container receptacle for the load-transfer system of FIG. 8.
Figure 10:
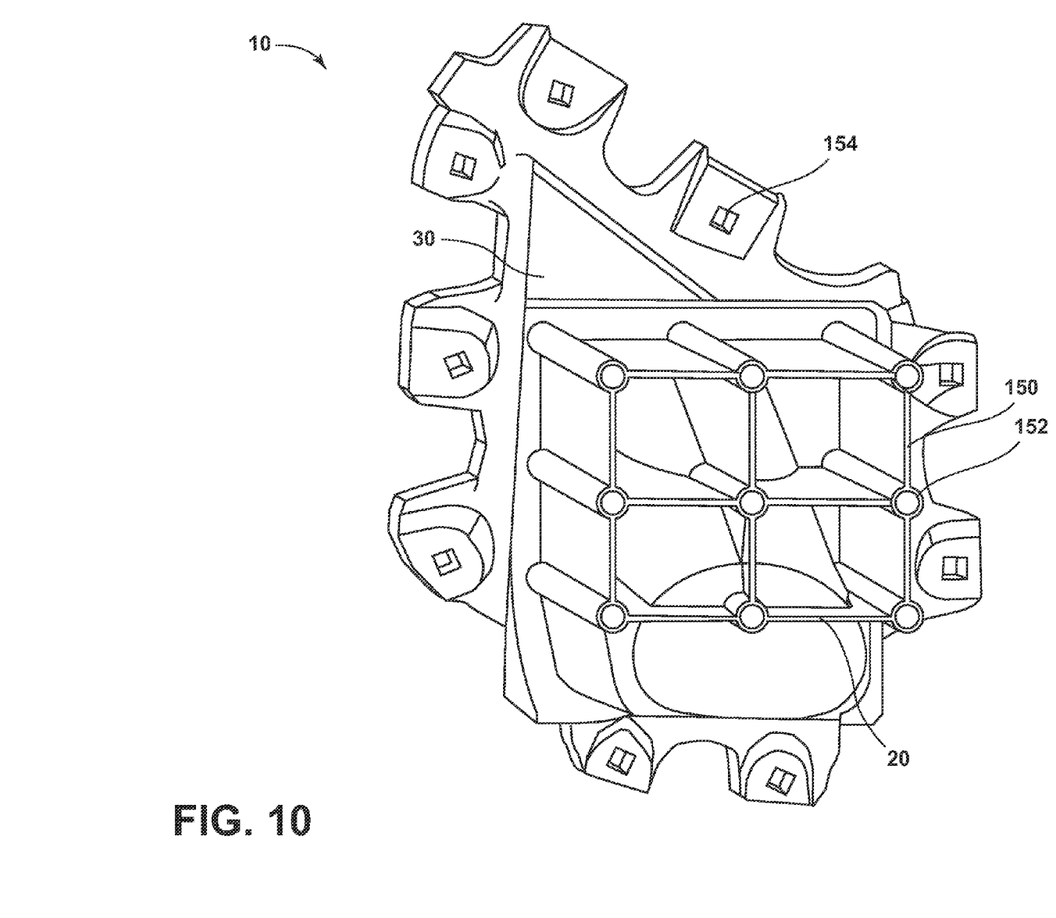
FIG. 10 is an alternate embodiment of an integrated pusher and container receptacle for the load-transfer system having a grid-structure pusher.

Referring now to FIGS. 8-10, in various embodiments, the pusher 20 can be made of a grid structure, having a plurality of ribs 150 that meet at various rib intersections 152 within the pusher 20. In such an embodiment, the ribs 150 and the rib intersections 152 can be made of various materials that include, but are not limited to, metal, plastic, polymers, rubber, resin, combinations thereof and other substantially sturdy materials. It is contemplated that the various ribs 150 can be arranged in a substantially orthogonal configuration. Alternate configurations are also contemplated including, but not limited to, radial configurations, irregular configurations, circular configurations, angled or diagonal configurations, other geometric configurations, combinations thereof, and other similar configurations. It is further contemplated that the ribs 150 can extend the full height of the container receptacle 30, extend along only a portion thereof or, in various embodiments, extend beyond the container receptacle 30. It should be understood that the size, shape and thickness of the pusher 20 can vary depending on the configuration of the various components of the vehicle door 12 and the design of the transmittal zone 32.

Referring to FIGS. 8 and 9, where the pusher 20 is integrated with the container receptacle 30, it is contemplated that the container receptacle 30 can include a plurality of attachment points 154 that are configured to couple the container receptacle 30 and the integrated pusher 20 to the upper and lower metal strips 54, 56 of the transmittal zone 32 of the vehicle door 12. In this manner, the pusher 20 can be disposed in a substantially fixed position relative to the transmittal zone 32, such that it can properly receive the side-impact load 34 during a side-impact condition. In the various embodiments, the attachment points 154 can be coupled to the container receptacle 30, such that the attachment points 154 can be configured to further guide the pusher 20 toward the structural member 18 of the vehicle frame 14.

Referring again to FIGS. 1-7, it is contemplated that the load-transfer system 10 described above can be positioned within any one of the vehicle doors 12 of the vehicle 16. In this manner, each of the vehicle doors 12 can include a pusher 20 positioned proximate a weakened portion of the corresponding vehicle door 12. It is further contemplated that the load-transfer system 10 can be disposed outside a vehicle door 12, such as in one of the vehicle pillars 160, such as the "B"-pillar of the vehicle 16. It is further contemplated that the load-transfer system 10 described above can be used in other portions of a vehicle 16 to transfer various loads, such as front-impact loads, rear-impact loads, crushing-type loads, and other similar loads toward portions of the vehicle frame 14 to minimize the effect of such forces on the passenger cabin 52 of the vehicle 16.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A load-transfer system comprising:
   a pusher disposed proximate a vehicle door and selectively distal from a vehicle frame; and
   a transmittal zone of the vehicle door proximate the pusher and the vehicle frame, wherein when the vehicle door receives a side-impact load, the pusher moves through the transmittal zone to a collapsed position below a vehicle seat into engagement with the vehicle frame and transfers the side-impact load to the vehicle frame.

2. The load-transfer system of claim 1, wherein the transmittal zone is at least partially defined by a container receptacle defined within a door trim of the vehicle door and proximate an inner sheet metal panel of the vehicle door.

3. The load-transfer system of claim 2, wherein the container receptacle is a bottle holder.

4. The load-transfer system of claim 2, wherein the pusher is disposed between the door trim and an outer sheet metal panel of the vehicle door.

5. The load-transfer system of claim 2, wherein the pusher is attached to the container receptacle.

6. The load-transfer system of claim 1, wherein the collapsed position places the pusher into engagement with a cross member of the vehicle frame.

7. The load-transfer system of claim 1, wherein the pusher includes a grid structure including a plurality of substantially orthogonal ribs.

8. The load-transfer system of claim 1, wherein the pusher includes a substantially solid member.

9. The load-transfer system of claim 4, wherein the pusher is disposed on a wet side of the vehicle door proximate the outer sheet metal panel.

10. The load-transfer system of claim 1, wherein the vehicle door proximate the transmittal zone is adapted to flex as a result of the side-impact load, wherein the pusher substantially occupies a portion of the vehicle door proximate the transmittal zone.

* * * * *